Oct. 18, 1966        G. A. GRANITSAS ETAL        3,279,942
FIBER TYPE ENERGY-CONDUCTING STRUCTURES
AND METHOD OF MAKING SAME
Filed Dec. 18, 1961
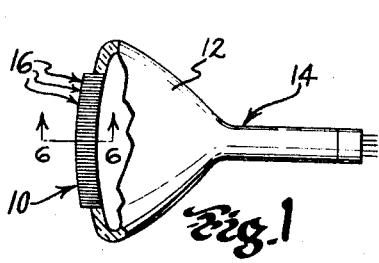
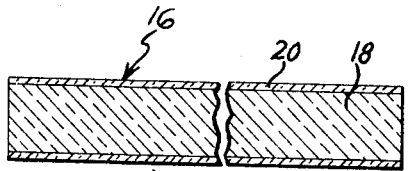
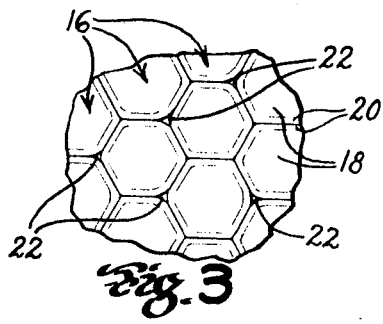
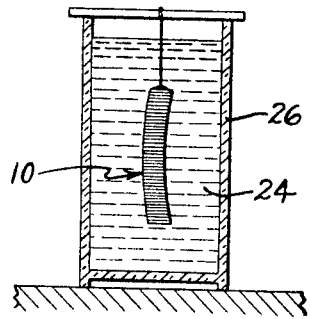
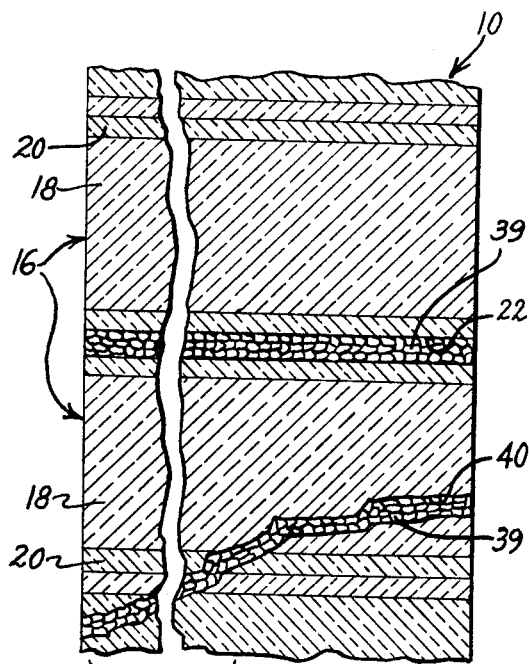
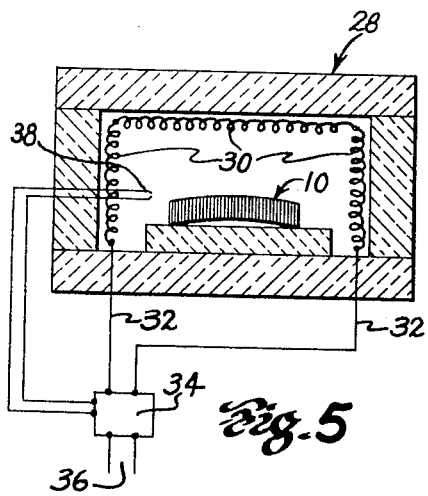
INVENTORS
GEORGE A. GRANITSAS
HARRY D. CRANDON
BY Louis L. Gagnon
ATTORNEY

United States Patent Office 3,279,942
Patented Oct. 18, 1966

3,279,942
FIBER TYPE ENERGY-CONDUCTING STRUCTURES AND METHOD OF MAKING SAME
George A. Granitsas, Marlboro, Mass., and Harry D. Crandon, Woodstock, Conn., assignors to American Optical Company, Southbridge, Mass., a voluntary association of Massachusetts
Filed Dec. 18, 1961, Ser. No. 159,984
5 Claims. (Cl. 117—124)

This invention relates to energy-conducting structures formed of a plurality of fiber-like elements secured together in side-by-side relation with each other and has particular reference to fused fiber face plates which are hermetically sealed throughout and method of sealing the same.

Fiber energy-conducting face plates of the type relating more particularly to this invention are formed by bundling a plurality of glass clad fiber elements together in mosaic fashion and heating the resultant array thereof to a temperature suitable for bringing about fusion of the fiber elements. During fusion, lateral compressing forces are usually applied to the array of fiber elements in an attempt to close off as many voids therebetween as possible. This practice produces structures whose fiber elements are generally quite well integrated but very often minute crevices or other porosities remain unsealed between some of the fiber elements. Consequently, in normal production, a relatively large percentage of the resultant fused structures are permeable to air or gases particularly when subjected to pressure or the pull of a vacuum and must be rejected as unsuitable for use as face plates on devices such as cathode ray tubes or the like wherein such face plates must be vacuum tight.

Numerous attempts have been made to overcome the relatively high rejection rate of face plate structures of the above character, and, for the most part, such attempts have dealt with variations in the methods of making the initial assembly and techniques for applying greater than usual compressing forces on the fiber elements. Techniques which rely on temperatures and pressures in the order of those required to assure a complete vacuum seal between all fiber elements most generally cause the individual fiber elements to become impaired by overheating and/or seriously distorted under the pressures applied with the consequence of producing a vacuum-tight but otherwise inferior product.

Other conventional sealing techniques involve the application of superficial layers of sealing material such as glass or the like to the energy receiving and/or emitting surfaces of the fiber face plate structures. This approach to the problem is difficult and costly to perform and such sealing layers are usually, in one way or another, detrimental to the energy-conducting properties of the end product.

This invention provides a simple, inexpensive and exceptionally reliable process for sealing crevices or other porosities between the fiber elements of fused structures wherein the above-mentioned shortcomings and other obvious difficulties inherent in conventional practices of this nature are obviated.

Accordingly, a principal object of the invention is to provide vacuum-sealed fiber face plate structures and a novel method of making the same.

Another object is to provide a technique for sealing fused fiber-type structures which may be readily adapted as a simple and inexpensive follow-up operation to any or all processes used to initially fabricate the fused fiber-type structures.

Another object is to provide a sealing medium for the purposes of this invention which when applied to the fiber-type structure will readily permeate existing crevices, interstices or other porosities therein and when cured will permanently seal said porosities and be capable of withstanding temperatures in the order of those which might be required to perform subsequent edge fusing or other similar operations on said structure during its assembly with articles intended to receive the same.

Another object is to provide a sealing medium of the above character and method of applying the same to fused fiber structures wherein the process of sealing such structures with said medium may be repeated any number of times which might be required to provide a build-up of said medium in relatively large crevices or interstices existing therein and provide a vacuum-tight seal.

Another object is to provide a silica network as a sealing medium and to further provide a novel process for forming the silica network in the porosities of an article which is to be sealed thereby.

Another object is to accomplish the foregoing by soaking the structure to be vacuum-sealed in silicic acid for a period sufficient to cause the porosities therein to become substantially filled with the silicic acid and inducing polymerization and dehydration of the silicic acid to provide the silica network.

Other objects and advantages of the invention will become apparent from the following description when taken in conjunction with the accompanying drawings in which:

FIG. 1 is a partially broken away side elevational view of a cathode ray tube having a fused face plate of the type relating more particularly to this invention;

FIG. 2 is a greatly enlarged longitudinal cross-section of an energy-conducting fiber element which is representative of a type commonly used in the fabrication of cathode ray tube face plates or the like;

FIGURE 3 is a greatly enlarged fragmentary plan view view of the fiber face plate shown in FIG. 1 as it might appear before treatment in accordance with the invention;

FIGS. 4 and 5 are diagrammatic illustrations of means and method for carrying out the process of the invention; and FIG. 6 is a fragmentary cross-sectional view taken on line 6—6 of FIG. 1 shown on a greatly enlarged scale so as to clearly illustrate the cross-sectional structure of the face plate and the results of treatment thereof in accordance with this invention.

The process of the invention which relates to the sealing of porosities in conventionally formed fiber-type face plate structures or the like is illustrated in the drawings wherein like characters of reference designate like parts throughout the various views thereof.

In FIG. 1 there is shown a fiber face plate 10 which is representative of the general type of structures to which the vacuum sealing process of the invention is particularly applicable. The face plate 10 in this instance is intended to receive and transfer energy through the envelope 12 of a cathode ray type of electron tube 14.

In such electron tubes, a vacuum is provided within the envelope 12 and must be sustained throughout the expected life of the tube. Leakage in tube envelopes of the above character can be relatively easily prevented at the joinders made between the fiber face plate and the envelope proper by the practice of conventional glass fusing and/or glass soldering techniques. However, in view of the fact that fiber structures such as the face plate 10 are usually made up of literally thousands of very fine individual fiber elements 16 (see FIGS. 2 and 3) which are joined by fusion in side-by-side relation with each other, it is extremely difficult to provide a complete vacuum seal between each and every fiber element at the time the face plate is fabricated.

In conventional optical or light-conducting face plate structures the fiber elements 16 usually each embody a core section 18 (see FIG. 2) of optical glass or the like having a relatively high index of refraction surrounded by a relatively thin cladding 20 of glass having a relatively low index of refraction. A typical fiber construction might, for example, embody a core 18 formed of optical flint glass having an index of refraction of approximately from 1.66 to 1.75 with a cladding 20 formed of crown or soda lime glass having an index of refraction of approximately 1.52. The cladding is generally of a thickness approximately 1/10 that of the overall fiber diameter but may vary considerably from this figure in certain cases. It is pointed out that the fiber elements 16 might also be provided with core parts formed of special glasses characterized to be primarily transmissive to selected regions of the spectrum and the claddings may be formed of glasses having controlled light-absorbing or other special characteristics. The fiber elements 16 may be of the monofilament type each having a single core part and cladding as illustrated or they might be of the so-called "multifiber" type which, in itself, is a single fiber containing a plurality of energy-conducting cores each completely surrounded by cladding material.

The monofilament type of fibers may, for example, be formed by placing a rigid heat-softenable rod-like member of energy-conducting material within a tubular member of heat-softenable material wherein the rod and tube members are of the character desired of the respective core and cladding parts of the fibers and the assembly of the members is heated and drawn to a fiber size. Alternatively similar materials might be heated to a flowable state and extruded simultaneously, one surrounding the other to form fiber elements such as 16. These techniques are set forth in detail in patents numbered 2,980,957 and 2,992,517 respectively. Multifibers are formed by drawing a bundle of clad monofilaments, as a unit, down to a fiber size as shown, for example, in Patent Number 2,992,516.

While an optical or light-conducting fiber 16 has been shown for purposes of illustration in the drawings, it should be understood that wire type fibers may be used in the fabrication of face plates for purposes of receiving and transferring electrical rather than light energy. In such a case, the core 18 in FIG. 2 would be formed of a metallic material and the glass cladding 20 would, most likely, be somewhat thicker than illustrated.

For cathode ray tube face plates, fibers ranging in size from 3 to 4 microns in diameter to 3 or 4 mils or larger in diameter might be used. Smaller fibers, in general, produce better resolution in transferring image energy. For the purposes of transferring optical images, however, the fibers should not be as small in diameter as to approach the wavelength of the particular light which is to be transferred thereby.

In forming the fused structure of the face plate 10, a plurality of fiber elements 16 of preselected size and character are placed in side-by-side bundled relation with each other and heated to fusible temperatures while the bundle is simultaneously compressed to squeeze the fibers into intimate interfitting relation with each other as shown in FIG. 3. The fiber elements 16 may be initially circular, square, hexagonal or of any desired cross-sectional configuration.

The actual details involved in forming the face plate structure 10 will not be dealt with herein since this invention relates to the treatment of fused structures of this general character which may have been formed to this point by any technique whether conventional or otherwise.

As pointed out hereinabove, under the best of conditions fused fiber structures such as the face plate 10 cannot be consistently formed to be vacuum-tight and, consequently, leaks through the structures usually result from interstices 22 (see FIG. 3) between the fiber elements 16 which do not become completely closed at the time the fiber structure is fused. These interstices 22 are usually very minute and many times smaller in cross-sectional size than the actual size of the fiber elements 16 which make up the face plate 10 so that they are not readily detectable by visual inspection. Nevertheless, under the pull of a vacuum equivalent to that provided within cathode ray tubes or the like, such face plates are found to leak. That is, air will permeate through the interstices however small they may be. Minute fissures in the face plate structures may also contribute to troublesome leak problems in fused fiber face plate structures and while interstices such as mentioned above or fissures or other similar porosities may not be and normally are not consequential with regard to the energy-conducting capabilities or physical strength of the face plate structures, they do render the face plates inferior and unsuitable for use on items such as cathode ray tubes or the like which require positive vacuum seals.

In accordance with this invention, interstices, fissures and/or other porosities in fused fiber face plates are sealed with a silica network as follows:

A fresh silicic acid solution is prepared and the face plate structure to be treated is immersed therein for a period of time sufficient to allow the solution to fill the porosities therein. The face plate structure is next removed from the silicic acid solution, dried at a moderate temperature of from approximately from 25° C. to 40° C. for from 15 to 45 minutes and thereafter heated to a temperature of from approximately 180° C. to 200° C. for from ½ to 1 hour to cure or promote accelerated polymerization of the silicic acid in the porosities and thus form a silica ($SiO_2$) network which functions to seal said porosities.

In FIG. 4 the face plate 10 is illustrated as being immersed in a silicic acid solution 24 within a container 26 and in FIG. 5 a curing oven 28 is illustrated diagrammatically and in which the face plate 10 is placed for drying and curing. Heat is produced in the oven 28 by means of conventional electrical resistance elements 30 or the like which are electrically connected by leads 32 through a conventional heat control unit 34 to a source of current 36. The unit 34 which might, for example, operate in response to a thermocouple or the like 38 functions to provide and maintain the oven at a proper temperature for bringing about an accelerated polymerization of the silicic acid.

Referring in more detail to the process of the invention, it is pointed out that, as mentioned above, a fresh solution of silicic acid is used. The terms "fresh solution" or "freshly prepared solution" as used herein are intended to mean a solution which is used immediately or within a period of no more than two or three days after its preparation. The use of a fresh solution of silicic acid is essential in instances where the porosities in the face plate 10 are minute as is most generally the case. A freshly prepared solution of silicic acid wherein the concentration of polymer is at a minimum will penetrate or be imbibed readily by capillary action into the porosities while commercial silicic acid solutions wherein the molecular size of the polymer is inherently larger, even at the minimum concentration which is available, will not adequately penetrate into the smaller porosities. Since relatively large interstices or cavities or the like are infrequent in conventionally fused fiber structures of the above character wherein the art of fusing is refined to the point of being able to avoid occurrence of the same, present-day difficulties relate almost entirely to small porosities which must be sealed. Thus a fresh silicic acid solution is, for all practical purposes, essential to the process of this invention.

It is well known that a silicic acid solution such as normal silicic acid $Si(OH)_4$ may be prepared in various ways such as, for example, by treating a solution of potassium or sodium silicate with hydrochloric acid and a solution of ortho silicic acid in alcohol may be prepared by combining tetra ethyl ortho silicate, ethyl alcohol and hydrochloric acid in the following related proportions of ingredients:

| | Parts |
|---|---|
| (EtO)$_4$ Si | 100 |
| ET OH | 48 |
| 0.1 N HCl | 44 |

The above-given related proportions are such that the constituents are substantially fully reacted in the resultant solution and while these proportions may be varied to include more or less of one or more of the ingredients set forth above, any substantial variation from the proportions of ingredients set forth above by way of example will serve no useful purpose.

The solution of ortho silicic acid in alcohol when freshly prepared is preferred for carrying out the sealing process of the invention. However, it should be understood that silicic acid solutions prepared from other known constituents might be used.

Specific examples of actual treatment of fiber-type face plate structures indicated as Sample I and Sample II are given hereinafter wherein the leak rate due to porosities in the structures was determined before and after treatment by means of a standard helium leak detector which is often referred to as a "Mass Spectrometer Leak Detector." Such leak detectors are well known laboratory testing instruments and require no further description herein.

*Sample I*

Leak rate prior to treatment—$2.8 \times 10^{-7}$ cc. helium/second.
Treatment:
(a) Immersed overnight in freshly prepared solution of ortho silicic acid in alcohol.
(b) Heated to approximately 35° C. until dry.
(c) Baked ½ hour at 190° C.
Test:
Leak rate $1.1 \times 10^{-7}$ cc. helium/second.
Retreated:
Same as a, b, and c above.
Test:
No leak.

*Sample II*

Treatment:
(a) Immersed overnight in freshly prepared solution of ortho silicic acid in alcohol.
(b) Heated approximately 30 minutes at approximately 35° C. to dry.
(c) Baked ½ hour at 190° C.
Test:
Leak rate $8.4 \times 10^{-7}$ cc. helium/second.
Retreated:
Same as a, b, and c above.
Test:
Leak rate $5.8 \times 10^{-7}$ cc. helium/second.
Retreated:
(a) Immersed in freshly prepared solution of ortho silicic acid in alcohol 30 minutes.
(b) Dry 30 minutes at 30° C.
(c) Bake 30 minutes at 190° C.
(d) Cool 30 minutes.
(e) Repeat a, b, c and d.
(f) Repeat a, b, c and d.
Test:
No leak.

It is pointed out that the solution of ortho silicic acid in alcohol which inherently contains some water and which was used in the treatment of Samples I and II was prepared as outlined hereinabove and the above-disclosed moderate drying temperatures are applied to the face plate structure primarily to volatilize and dispel the more volatile constituents (ethyl alcohol and water) of the silicic acid solution at a moderate rate so as not to force the silicic acid out of the pores of the structure being treated. The subsequently applied higher temperatures accelerates polymerization of the silicic acid and dries off the water thus formed, leaving substantially only a silica (SiO$_2$) network 39 (see FIG. 6) in the porosities of the fiber structure.

The porosities may be in the form of interstices extending between two adjacent fiber elements 16 as shown by the reference numeral 22 in FIGS. 3 and 6 or in the form of fissures, one of which is also shown in FIG. 6 by the reference numeral 40. Other types of porosities may embody interjoining interstices 22 and/or fissures 40 which provide passageways through the fiber structure of the face plate 10. It is pointed out that the showing in FIG. 6 is greatly exaggerated in size for purposes of illustration, and a fissure such as shown by numeral 40, if existent, might not extend completely through the structure as shown, but might for example extend somewhat laterally into communication with one or more of the interstices 22.

As it is evident from the foregoing, the process of the invention may be repeated any number of times to build up a silica network 39 which eventually completely closes off larger porosities. Furthermore, the required time of immersion of the face plate in the silicic acid solution should be such as to cause all porosities to become substantially completely filled with the silicic acid solution. However, since the minimum immersion time required to accomplish this result is dependent upon the size of porosities to be filled, which porosities may vary in size throughout each fiber structure, and the size of porosities can only be estimated to be of a size in accordance with the leak rate of the structure, it is preferable to initially immerse the structure in the silicic acid solution for an extended period (for example, overnight) when possible and particularly when the initial leak rate is in the order of that given in Sample I above. After drying and baking in the manner outlined above, a test for leaks will determine whether or not repeated treatment is required for producing a positive vacuum seal. As it is evident from the above-outlined treatment of Sample II, a subsequent immersion period or periods of only a few minutes each may be adequate. It should be understood that the suggested overnight immersion period is not essential to the process of the invention and that shorter periods of immersion such as from 15 to 45 minutes may be used wherein each immersion period is followed by the drying and baking periods set forth hereinabove. Fiber structures initially having a low order leak rate such as, for example, $1.1 \times 10^{-7}$ cc. helium/second or less as determined with a standard helium leak detector usually require immersion periods of less than 1 hour followed by drying and baking as outlined hereinabove for the accomplishment of a substantially perfect vacuum-tight seal.

Fiber-type structures of the above character which have been vacuum-sealed in accordance with this invention can be reheated to relatively high temperatures for purposes of edge sealing the same in tube envelopes or the like as shown in FIG. 1 without detriment to the effectiveness of the seal produced by the silica network therein. By way of example, the above-described Samples I and II were reheated to 850° F. for approximately 1 hour each and when cooled and tested no leak rate was indicated.

From the foregoing, it can be seen that novel means and method have been set forth for accomplishing all of the objects and advantages of the invention. Nevertheless, it should be apparent that many changes in the steps of the method and other details set forth hereinabove may be made without departing from the spirit of the invention as expressed in the accompanying claims. The invention, therefore, is not to be limited to the exact matters shown and described as only preferred matters have been given by way of illustration.

We claim:
1. The method of sealing interstices in an assembly of a large number of glass clad energy-conducting fibers all fused together in side-by-side substantially parallel relationship with each other, said method comprising the steps of introducing a solution of a silicic acid into said interstices and thereafter heating said structure to a temperature sufficient to induce dehydration and substantially complete polymerization of said silicic acid in situ thereby forming a silica network which seals said interstices.

2. The method as recited in claim 1 wherein said structure is heated to a temperature of approximately from 25° to 40° centigrade for a period of from approximately 15 to 45 minutes to induce said dehydration of said solution whereupon said temperature is raised to approximately from 180° to 200° centigrade for a period of from one half to one hour to further dehydrate and effect said polymerization of said solution.

3. The method as recited in claim 1 wherein said structure is heated to a temperature of approximately from 20° to 40° centigrade for a period of from approximately 15 to 45 minutes to induce said dehydration of said silicic acid whereupon said temperature is raised to approximately from 180° to 200° centigrade for a period of from one half to one hour to further dehydrate and effect said polymerization of said solution.

4. The method as recited in claim 1 wherein said solution consists of approximately 100 parts tetra ethyl ortho silicate, 48 parts ethyl alcohol and 44 parts hydrochloric acid.

5. The method as recited in claim 4 wherein said structure is heated to a temperature of approximately from 20° to 40° centigrade for a period of from approximately 15 to 45 minutes to volatilize and dispel said ethyl alcohol and aqueous constituents of said solution from said interstices substantially without forcing said silicate therefrom whereupon said temperature is raised to approximately from 180° to 200° centigrade for a period of time sufficient to substantially completely polymerize said silicate within said interstices.

References Cited by the Examiner
UNITED STATES PATENTS

| | | | |
|---|---|---|---|
| 2,201,840 | 5/1940 | Venable | 117—91 |
| 2,354,591 | 7/1944 | Goldsmith | 88—1 X |
| 2,442,976 | 6/1948 | Heany | 117—124 |
| 2,825,260 | 3/1958 | O'Brien | 88—1 |

WILLIAM D. MARTIN, *Primary Examiner.*

JEWELL H. PEDERSEN, J. K. CORBIN, H. W. MYLIUS, *Assistant Examiners.*